United States Patent
Ahn

(10) Patent No.: US 10,133,959 B2
(45) Date of Patent: Nov. 20, 2018

(54) MACHINE VISION SYSTEM USING QUANTUM MECHANICAL HARDWARE BASED ON TRAPPED ION SPIN-PHONON CHAINS AND ARITHMETIC OPERATION METHOD THEREOF

(71) Applicant: University of Seoul Industry Cooperation Foundation, Seoul (KR)

(72) Inventor: Do Yeol Ahn, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 0 days.

(21) Appl. No.: 15/293,460

(22) Filed: Oct. 14, 2016

(65) Prior Publication Data

US 2017/0109605 A1    Apr. 20, 2017

(30) Foreign Application Priority Data

Oct. 15, 2015    (KR) .................. 10-2015-0143833

(51) Int. Cl.
*G06K 9/62*    (2006.01)
*G06K 9/46*    (2006.01)
(Continued)

(52) U.S. Cl.
CPC ......... *G06K 9/6201* (2013.01); *G06K 9/4604* (2013.01); *G06K 9/468* (2013.01);
(Continued)

(58) Field of Classification Search
CPC .................................................. G06N 99/002
See application file for complete search history.

(56) References Cited

U.S. PATENT DOCUMENTS 6,838,694 B2    1/2005    Esteve et al.
7,788,192 B2    8/2010    Amin
(Continued)

FOREIGN PATENT DOCUMENTS

JP    2013-114596 A    6/2013
JP    5376482 B1    12/2013
(Continued)

OTHER PUBLICATIONS

"Simulating Physics with Computers", Richard P. Feynman, International Journal of Theoretical Physics, vol. 21(1982) pp. 467-488.
(Continued)

*Primary Examiner* — Qian Yang
(74) *Attorney, Agent, or Firm* — Mintz Levin Cohn Ferris Glovksy and Popeo, P.C.; Kongsik Kim; Jhongwoo Jay Peck

(57) ABSTRACT

Disclosed are a quantum system-based image pattern recognition computation apparatus and method for machine vision and a quantum system-based machine vision apparatus. The computation apparatus recognizes patterns between images in machine vision by using a quantum system. The computation apparatus includes a modeling unit and an interpretation unit. The modeling unit sets up an objective function based on the similarity between a first pattern derived from the relationships between points of interests of a first image and a second pattern derived from the relationships between points of interests of a second image. The interpretation unit finds an optimum first pattern and an optimum second pattern, in which the similarity between the first pattern and the second pattern is optimized, by interpreting a final quantum state obtained through an adiabatic evolution process of the quantum system in which the objective function is optimized.

14 Claims, 8 Drawing Sheets

(51) Int. Cl.
*G06K 9/66* (2006.01)
*G06N 99/00* (2010.01)
*G06N 3/04* (2006.01)

(52) U.S. Cl.
CPC ............ *G06K 9/469* (2013.01); *G06K 9/6211* (2013.01); *G06K 9/6256* (2013.01); *G06K 9/6267* (2013.01); *G06K 9/66* (2013.01); *G06N 3/0454* (2013.01); *G06N 99/002* (2013.01)

(56) References Cited

U.S. PATENT DOCUMENTS

| | | | |
|---|---|---|---|
| 8,472,699 | B2 | 6/2013 | Ng et al. |
| 8,504,497 | B2 | 8/2013 | Amin |
| 2005/0207718 | A1 | 9/2005 | Komura et al. |
| 2012/0045136 | A1* | 2/2012 | Rose ............... B82Y 10/00 382/209 |
| 2015/0006443 | A1 | 1/2015 | Rose et al. |
| 2016/0162798 | A1* | 6/2016 | Marandi ............ G02F 3/00 708/191 |
| 2016/0176343 | A1* | 6/2016 | Sakano ............. G06T 7/80 348/148 |
| 2017/0132798 | A1* | 5/2017 | Piper ............... G06T 7/337 |

FOREIGN PATENT DOCUMENTS

| | | |
|---|---|---|
| JP | 2014-241484 A | 12/2014 |
| JP | 5823270 B2 | 11/2015 |
| KR | 10-2008-0106911 | 12/2008 |
| KR | 10-1309677 B1 | 9/2013 |

OTHER PUBLICATIONS

"Introduction to Quantum Algorithms", Shor, P. W., arXiv.org:quantph/0005003(2001), pp. 1-17.
Makhlin et al., 2001, Reviews of Modern Physics 73, pp. 357-400.
Nielsen and Chuang, "Quantum Computation and Quantum Information", Cambridge University Press, Cambridge(2000), pp. 343-345.
"A High-Level Look at Optimization: Past, Present, and Future" e-Optimization.com, 2000.
Shirts et al., 2000, Science 290, pp. 1903-1904.
Allen et al.,2001, IBM Systems Journal 40, pp. 310-327.
Dolan et al., 2002, SIAM News vol. 35, p. 6.
Fourer et al.,2001, interfaces 31, pp. 130-150.
"Image recognition with an adiabatic quantum computer. I. Mapping to quadratic unconstrained binary optimization", Hartmut Neven et al., Apr. 28, 2008.

* cited by examiner (a)  (b)

MACHINE VISION SYSTEM USING QUANTUM MECHANICAL HARDWARE BASED ON TRAPPED ION SPIN-PHONON CHAINS AND ARITHMETIC OPERATION METHOD THEREOF

CROSS-REFERENCE TO RELATED APPLICATION

This application claims under 35 U.S.C. § 119(a) the benefit of Korean Patent Application No. 10-2015-0143833 filed on Oct. 15, 2015, which is incorporated herein by reference.

TECHNICAL FIELD

The present invention generally relates to technologies related to an ion trap-based quantum-mechanical machine vision system and computation method, and more particularly to an ion trap-based quantum-mechanical machine vision system and computation method, which are capable of solving a complex machine vision problem by modeling the complex machine vision problem as the interaction between relation vectors between principal points of interest.

BACKGROUND ART

Currently, humans have analytical abilities superior to those of machine-based analysis in various fields, such as object recognition, knowledge representation, reasoning, learning, natural language processing, etc. Accordingly, to mechanically imitate or surpass the human way of thinking, a complex computation method must be performed, and thus significant difficulties are entailed.

As an example of these difficulties, to imitate or surpass the human ability to perform visual recognition, an accurate solution to the optimization problem of a machine vision system is required.

A method of performing quantum-mechanical computation by using quantum computing was proposed to overcome the complex computational problem of machine vision.

As an example, a Turing machine is a theoretical computing system that was proposed by Alan Turing in 1936. A Turing machine capable of efficiently simulating another Turing machine is referred to as a universal Turing machine (hereinafter referred to as the "UTM"). The Church-Turing thesis is characterized by the premise that any practical computation model is equivalent to or has a subset of UTM performance.

A quantum computer is a specific physical system that uses one or more quantum effects in order to perform computation. A quantum computer capable of efficiently simulating another quantum computer is referred to as a universal quantum computer (UQC).

In 1981, Richard P. Feynman stated that quantum computers could be used to more effectively solve a specific computational problem than UTMs and invalidate the Church-Turing thesis. The associated content is described in the paper by R. P. Feynman, "Simulating Physics with Computers," International Journal of Theoretical Physics, Vol. 21 (1982), pp. 467-488.

For example, Feynman stated that a quantum computer could be used to simulate any other quantum system capable of performing exponentially faster computation for any characteristic property of the simulated quantum system than a UTM.

1. Approaches to Quantum Computation

There are a few general approaches to the design and operation of quantum computers. One approach is the "circuit model" of quantum computation. In this approach, qubits operate in accordance with the sequence of logical gates, which is the representation of a compiled algorithm. Circuit model quantum computers have a few serious barriers in their practical execution. In the circuit model, qubits are required to maintain coherence for a period longer than a single gate time. This requirement is raised because the circuit model quantum computers generally require operations collectively called "quantum error correction" to perform their operations. The quantum error correction cannot be performed without the qubits of circuit model quantum computers capable of maintaining quantum coherence for a period that is about 1,000 times a single gate time. There have been a number of studies that focus on the development of qubits having coherence sufficient to form the basic information units of circuit model quantum computers. The associated content is described in the paper by P. W. Shor, "Introduction to Quantum Algorithms," arXiv., org: quantph/000 5003 (2001), pp. 1-27. This technical field has still remained stagnant due to lack of the ability to improve the coherence of qubits to the level appropriate to design and operate actual circuit model quantum computers.

2. Qubits

Qubits are used as the basic units of information for quantum computers. Like bits in universal Turing machines (UTMs), qubits can represent at least two different quantities. Qubits may refer to actual physical devices in which information is stored, or may refer to information units themselves which are extracted from the physical devices of the qubits.

Qubits generalize the concept of classical digital bits. A classical information storage device can generally encode two different states that are classified as the labels "0" and "1." Physically, these two different states are represented by two different, distinct physical states of a classical information storage device, such as the orientation and scale of a magnetic field, a current or a voltage. The quantities adapted to encode bit states follow the laws of classical physics. Furthermore, a qubit may also include two different physical states that are classified as the labels "0" and "1." Physically, these two different states are represented by two different, distinct physical states of a quantum information storage device, such as the orientation and scale of a magnetic field, a current or a voltage. The quantities adapted to encode bit states follow the laws of quantum physics. If physical quantities storing the above states mechanically operate like quanta, the device may be additionally located in the superposition of "0" and "1." That is, a qubit can simultaneously exist in states "0" and "1," and may perform computation in the two states.

3. Superconducting Qubits

In connection with the use of quantum computers, there are many different hardware and software approaches. One hardware approach is to use integrated circuits made of a superconductive material, such as aluminum or niobium.

The technologies and processes included in a process of designing and fabricating superconducting integrated circuits are similar to technologies and processes that are used for conventional integrated circuits.

Superconducting qubits correspond to a type of superconducting devices that can be included in superconducting integrated circuits. Superconducting qubits may be classified into a few categories that are dependent on physical quantities that are used to encode information. For example, superconducting qubits may be classified into charge devices, flux devices and phase devices, which are described in the paper by Makhlin et al., 2001, Reviews of Modern Physics 73, pp. 357-400. The charge devices store and process information regarding the charge states of devices, and unit charges are composed of pairs of electrons called "Cooper pairs." A Cooper pair includes 2e charges, for example, two electrons bound by phonon interaction. The associated content is described in the paper by Nielsen and Chuang, "Quantum Computation and Quantum Information," Cambridge University Press, Cambridge 2000, pp. 343-345. The flux devices store information about magnetic flux-related variables via parts of the devices. The phase devices store information regarding variables related to differences in superconductive phase between two regions of the phase devices. Recently, hybrid devices using two or more charges, fluxes and degrees of freedom of phase have been developed. The associated content is described in documents, for example, U.S. Pat. No. 6,838,694 and U.S. patent application Ser. No. 11/082,519 (U.S. Patent Publication No. US 2005/0207718 A1).

4. Computational Complexity Theory

In computer science, computational complexity theory is a type of theory of computation used to research into resources or costs and a type of theory of computation required to solve a given computational problem. The costs are generally measured using abstract parameters called "computational resources," like time and space. The time refers to the number of steps required to solve a problem, and the space refers to the amount of information required and to be stored or the amount of memory required.

Optimization problems correspond to problems in which one or more objective functions are minimized or maximized for a set of variables, sometimes under the condition of sets of constraints.

For example, a traveling salesman problem (TSP) corresponds to an optimization problem in which, for example, an objective function representative of a distance or costs must be optimized to find an itinerary. This itinerary is encoded as a set of variables representative of an optimized solution to the problem. For example, the problem may be composed of a process of finding the shortest path through which all regions are accurately visited once in the state in which lists of the regions have been given. Other examples of optimization problems include a maximum independent set, integer programming, constraint optimization, factoring, prediction modeling, and k-SAT. These problems correspond to the abstractions of many real-world optimization problems, such as operation research, financial portfolio selection, scheduling, supply management, circuit design, and route optimization. The associated content is described in the paper: "A High-Level Look at Optimization: Past, Present, and Future" e-Optimization.com, 2000."

Simulation problems generally deal with the simulation of a single system that is performed by another system during a normal time interval. For example, computer simulations include business processes, ecological habitats, protein folding, molecular ground states, and quantum systems. These problems often include a number of various entities different from a complex interrelationship and behavioral rules. Feynman stated that quantum systems could be more efficiently used to simulate some physical systems than UTMs.

Many optimization and simulation problems cannot be solved by using UTMs. Due to this constraint, computation devices capable of solving computational problems beyond the level of UTMs are required. For example, in the field of protein folding, grid computing systems and supercomputers have been used to simulate large protein systems. The associated content is described in the paper by Shirts et al., 2000, Science 290, pp. 1903-1904, and Allen et al., 2001, IBM Systems Journal 40, p. 310. The NEOS solver is an online network solver for optimization problems. When a user submits an optimization problem and selects an algorithm to be used, a central server directs the problem to a computer on a network, on which the selected algorithm can be executed. The associated content is described in the paper by Dolan et al., 2002, SIAM News Vol. 35, p. 6. Other digital computer-based systems and methods for the solution of optimization problems can be found. The associated content is described in documents, for example, the document by Fourer et al., 2001, interfaces 31, pp. 130-150. However, all these methods are limited by the fact that the methods use digital computers, which are UTMs. Accordingly, the limitation of classical computation that imposes undesirable scaling between a problem scale and solving time may be easily encountered.

An example of a technology for solving such optimization problems is described in Korean Patent No. 10-1309677 entitled "Adiabatic Quantum Computation Method."

This preceding technology is directed to a quantum computation method using a quantum system including a plurality of qubits. The quantum computation method enables quantum annealing adapted to simultaneously track configurations in a superimposed state in order to obtain minimum energy (or costs) finally desired in quantum computing, and employs an adiabatic quantum computation (AQC) technique particularly in order to perform quantum annealing. Furthermore, AQC employs a technique for finally obtaining a solution in a desired target state by generating an adiabatic change of a Hamiltonian from an initial state to the target state.

Although the preceding technology describes the general operation of a quantum computing system for the solution of a complex problem, the selection of an optimized quantum system for the solution of a specific complex problem still remains a significantly important problem in spite of the presence of the preceding technology.

PRECEDING TECHNICAL DOCUMENTS

Patent Documents

Patent document 1: Korean Patent No. 10-1309677 registered on Sep. 11, 2013
Patent document 2: U.S. Pat. No. 6,838,694 registered on Jan. 4, 2005
Patent document 3: U.S. Pat. No. 7,788,192 registered on Aug. 31, 2010
Patent document 4: U.S. Pat. No. 8,504,497 registered on Aug. 6, 2013
Patent document 5: U.S. Patent Publication No. US 2005/0207718 A1 published on Sep. 22, 2005

Non-Patent Documents

Non-patent document 1: "Simulating Physics with Computers," Richard P. Feynman, International Journal of Theoretical Physics, Vol. 21, 1982, pp. 467-488.
Non-patent document 2: "Introduction to Quantum Algorithms," Shor, P. W., arXiv. org:quantph/0005003, 2001, pp. 1-27.

Non-patent document 3: Makhlin et al., 2001, Reviews of Modern Physics 73, pp. 357-400.

Non-patent document 4: Nielsen and Chuang, "Quantum Computation and Quantum Information," Cambridge University Press, Cambridge 2000, pp. 343-345.

Non-patent document 5: "A High-Level Look at Optimization: Past, Present, and Future," e-Optimization.com, 2000.

Non-patent document 6: Shirts et al., 2000, Science 290, pp. 1903-1904, and Allen et al., 2001, IBM Systems Journal 40, p. 310.

Non-patent document 7: Dolan et al., 2002, SIAM News Vol. 35, p. 6.

Non-patent document 8: Fourer et al., 2001, interfaces 31, pp. 130-150.

Non-patent document 9: "Image recognition with an adiabatic quantum computer, I. Mapping to quadratic unconstrained binary optimization," Hartmut Neven et al., Apr. 28, 2008.

SUMMARY OF THE DISCLOSURE

An object of the present invention is to propose an ion trap-based quantum-mechanical machine vision system and computation method, which can solve a machine vision-related complex computational problem by modeling the machine vision-related complex computational problem as the interaction between relation vectors that depends on the relative location information between principal points of interest.

An object of the present invention is to propose an ion trap-based quantum-mechanical machine vision system and computation method, which applies an Ising model, i.e., a physical model related to the interaction between dipoles, to the interaction between vectors.

An object of the present invention is to easily solve a machine vision-related complex computational problem by using Ising model-based quantum computing hardware.

An object of the present invention is to use an adiabatic quantum computing (AQC) technique for obtaining a solution in a target state by generating the adiabatic change of a Hamiltonian among pieces of quantum computing hardware using an Ising model.

An object of the present invention is to configure quantum computing hardware by using an Ising model, particularly trapped ion-based spin-phonon coupling, and to solve a machine vision-related complex computational problem based on a physical model capable of solving the configured quantum computing hardware.

According to an aspect of the present invention, there is provided a quantum system-based image pattern recognition computation apparatus for machine vision, the computation apparatus recognizing patterns between images in machine vision by using a quantum system, the computation apparatus including: a modeling unit configured to set up an objective function based on the similarity between a first pattern derived from the relationships between points of interests of a first image and a second pattern derived from the relationships between points of interests of a second image; and an interpretation unit configured to find an optimum first pattern and an optimum second pattern, in which the similarity between the first pattern and the second pattern is optimized, by interpreting a final quantum state obtained through an adiabatic evolution process of the quantum system in which the objective function is optimized.

The modeling unit may be further configured to: vectorize the relationships between the points of interests of the first image, and generate the first pattern by modeling a set of the vectorized relationships between the points of interests of the first image as the first pattern; and vectorize the relationships between the points of interests of the second image, and generate the second pattern by modeling a set of the vectorized relationships between the points of interests of the second image as the second pattern.

The quantum system may include a physical model that depends on interaction between dipoles. The quantum system may include an Ising model that depends on dipole interaction of a magnetic body, and the Ising model may be a physical model that depends on trapped ion-based spin-phonon coupling.

The quantum system may include a physical model that has energy corresponding to the objective function.

According to another aspect of the present invention, there is provided a quantum system-based machine vision apparatus, the machine vision apparatus recognizing patterns between images by using a quantum system, the machine vision apparatus including: an optical module configured to acquire a first image; a processor configured to derive a first pattern from the relationships between points of interests of the acquired first image, and to derive a second pattern from the relationships between points of interests of a second image; and memory configured to store the derived first and second patterns; wherein the processor includes: a modeling unit configured to set up an objective function based on the similarity between the first pattern and the second pattern stored in the memory; and an interpretation unit configured to find an optimum first pattern and an optimum second pattern, in which the similarity between the first pattern and the second pattern is optimized, by interpreting a final quantum state obtained through an adiabatic evolution process of the quantum system in which the objective function is optimized.

The processor may be further configured to: vectorize the relationships between the points of interests of the first image, and generate the first pattern by modeling a set of the vectorized relationships between the points of interests of the first image as the first pattern; and vectorize the relationships between the points of interests of the second image, and generate the second pattern by modeling a set of the vectorized relationships between the points of interests of the second image as the second pattern.

The quantum system may include a physical model that depends on interaction between dipoles.

According to still another aspect of the present invention, there is provided a quantum system-based image pattern recognition computation method for machine vision, the computation method recognizing patterns between images in machine vision by using a quantum system, the computation method comprising: setting up an objective function based on the similarity between a first pattern derived from the relationships between points of interests of a first image and a second pattern derived from the relationships between points of interests of a second image; and finding an optimum first pattern and an optimum second pattern, in which the similarity between the first pattern and the second pattern is optimized, by interpreting a final quantum state obtained through an adiabatic evolution process of the quantum system in which the objective function is optimized.

The setting up may include: vectorizing the relationships between the points of interests of the first image, and modeling a set of the vectorized relationships between the points of interests of the first image as the first pattern; and vectorizing the relationships between the points of interests of the second image, and modeling a set of the vectorized relationships between the points of interests of the second image as the second pattern.

The quantum system may include a physical model that depends on interaction between dipoles, or may include an Ising model that depends on dipole interaction of a magnetic body.

The Ising model may be a physical model that depends on trapped ion-based spin-phonon coupling, and the quantum system may include a physical model that has energy corresponding to the objective function.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Other objects and features of the present invention will be apparent through descriptions of embodiments given in conjunction with the accompanying diagrams.

Embodiments of the present invention will be described in detail below with reference to the accompanying drawings. In the following description, detailed descriptions of related known components or functions that may unnecessarily make the gist of the present invention obscure will be omitted.

In the embodiments of the present invention, the lengths, scales and proportions of elements may be exaggerated for ease of description. The prevent invention is not limited or restricted to the embodiments. Throughout the accompanying drawings, the same reference symbols are assigned to the same components.

Figure 1:
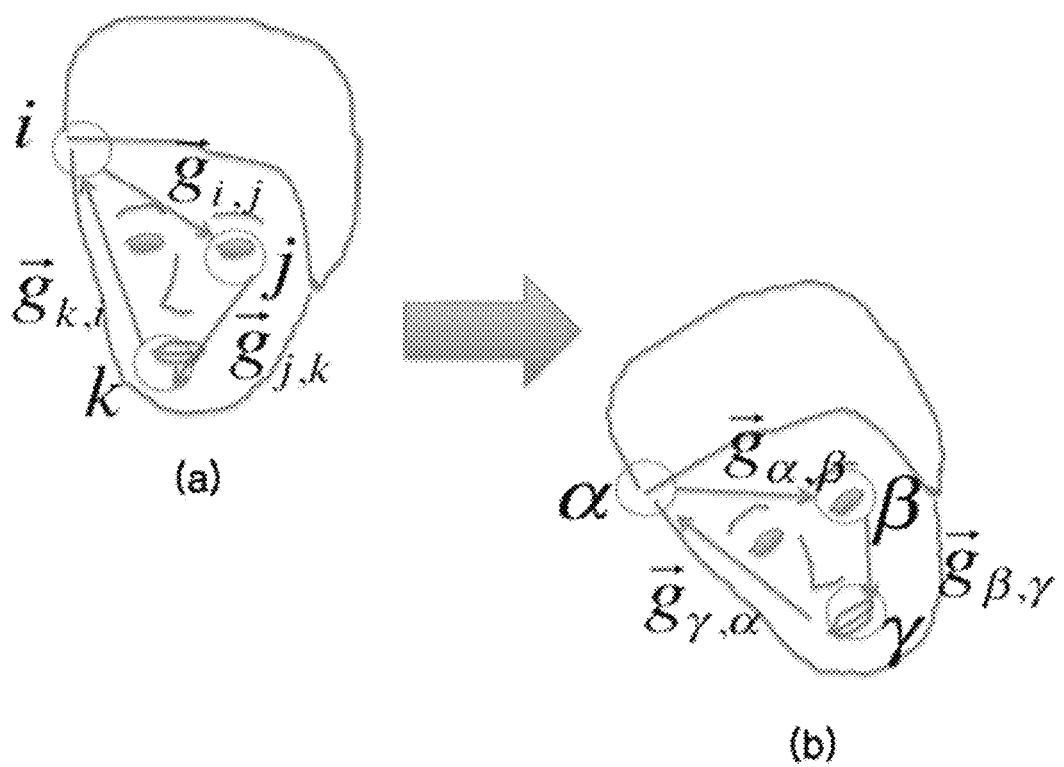
FIG. 1 is a view showing the modeling of the interaction between relation vectors between points of interest at principal points of interest according to an embodiment of the present invention.

FIG. 1 is a view showing the modeling of a process of pattern recognition between different images in a machine vision apparatus according to an embodiment of the present invention.

In a machine vision apparatus, a computer or a robot recognizes an image by comparing previously stored reference patterns with a photographed image. This process is advanced through training. Generally, an algorithm called a heuristic algorithm is applied to a particular type of image. Various heuristic algorithms may be applied based on the types of images.

In general, to perform pattern matching between different images, the vision of a human and the brain capable of recognizing visual information extract feature points that can describe a pattern represented by each of the images, recognize the locations and arrangement of the feature points and the distances and orientations between the feature points, and comprehensively recognize the feature points and the relative location information between the feature points as a pattern. Thereafter, the brain of the human determines whether the two images match each other by comparing pieces of pattern information extracted from the two images. This process cannot be performed simply based on the translation between a single point and a single point, but can be understood as obtaining a match between patterns each including surround points.

However, it is generally extremely difficult for machine vision having limited intelligence to completely imitate the operation of the brain of a human or the interpretation of sensory data of a human. The imitation of the operation of the brain of a human is known as a so-called NP-hard problem.

FIG. 1 shows the modeling of a process of pattern recognition between different images, and indicates that the process corresponds to a general NP-hard problem. Although the images of Part (a) and Part (b) of FIG. 1 are different images, the images may correspond to the different versions of an image having the same physical structure.

To perform machine vision-related pattern recognition computation, a type of combination of relation vectors indicative of relative location information between individual points of interest (feature points) in each image is used, and such a combination of relation vectors may be understood to have a meaning similar to that of a pattern that is a reference for the recognition of each image.

Meanwhile, a process of extracting a reference pattern for each image may include a process of extracting feature points, and a process of determining specific relative location information between feature points that can be recognized as relation vectors. This does not correspond to a deterministic problem, but corresponds to a non-deterministic problem that can be solved by finding optimized values while comparing results.

Assuming that a reference pattern composed of a set of relation vectors between points of interest (feature points) i, j and k within the image of Part (a) of FIG. 1 is X and a reference pattern composed of a set of relation vectors between points of interest (feature points) α, β and γ within the image of Part (b) of FIG. 1 is Y, a problem arises in that it is difficult to compute the reference pattern X of the image of Part (a) of FIG. 1 and the reference pattern Y of the image of Part (b) of FIG. 1.

To describe mapping between the image of Part (a) of FIG. 1 and the image of Part (b) of FIG. 1, the reference pattern X capable of describing Part (a) of FIG. 1 best and the reference pattern Y capable of describing Part (b) of FIG. 1 best must be obtained. The displacement from the reference pattern X to the reference pattern Y must be derived through computation. That is, finding relations descriptive of mapping between the image of Part (a) of FIG. 1 and the image of Part (b) of FIG. 1 may be viewed as finding the most optimized match of the reference pattern X and the reference pattern Y. In the present invention, this process is set up as a single objective function, and will be considered as an optimization problem that is intended to minimize the objective function. In this case, the optimization problem is known as an NP-hard problem as described above.

In the present invention, it is intended that the optimization problem is solved using quantum computing. In each image, arrows indicative of connections between points of interest (feature points) are modeled as dipoles. In this case, each of the arrows refers to the orientation and length between points of interest (feature points), and may be represented by a vector.

For this purpose, there may be defined (i) a term representative of a mismatch between a feature point of the image of Part (a) of FIG. 1 and a location corresponding to the feature point in the image of Part (b) of FIG. 1, and (ii) a term representative of the spatial consistency between matches of adjacent points obtained by measuring the divergence between the matches of the adjacent points.

Using a physical model of quantum computing, the most optimized pattern X in Part (a) of FIG. 1 and the most optimized pattern Y in Part (b) of FIG. 1 may be simultaneously found. The optimized reference pattern X and the optimized reference pattern Y may be simultaneously obtained by simultaneously modeling a combination of relation vectors between the points of interest (feature points) i, j and k in the image of Part (a) of FIG. 1 and a combination of relation vectors between the points of interest (feature points) in the image of Part (b) of FIG. 1 as a physical model for quantum computing and then observing the physical model. An optimized state may be obtained by taking the state of the physical model when the energy of the physical model is in a ground state. For example, when the physical model is implemented within a black box in which quantum computing is possible and the physical properties of the physical model within the black box are observed when a target state (a ground state) has been reached through an adiabatic evolution process by using the physical model, the optimized reference pattern X and the optimized reference pattern Y may be obtained as a result.

In this case, a physical model including dipoles as physical properties so that a combination of vectors between points of interest (feature points) in each image is described by a dipole model may be selected as a physical model within the black box.

A relation vector in which a point of interest (a feature point) i is a start point and a point of interest (a feature point) j is an end point in the image of Part (a) of FIG. 1 may be represented by $\vec{g}_{i,j}$. In this case, the relationship from the point of interest (a feature point) i to the point of interest (a feature point) j includes not only the translation between the feature points but also a local scale and an orientation. The relation vector $\vec{g}_{i,j}$ may be normalized for global translation, rotation, and scaling.

When a graph of the feature points i, j and k in Part (a) of FIG. 1 is defined as $G_A$ and a graph of the points of interest (feature points) $\alpha$, $\beta$ and $\gamma$ in Part (b) of FIG. 1 is defined as $G_3$, Equation 1 represents the definition of the distance between the feature points ($i \in G_A$, and $\alpha \in G_B$) derived from each image. When the number of feature points in Part (a) of FIG. 1 is M, $G_A$ is represented by a labeled graph having M nodes. When the number of feature points in Part (b) of FIG. 1 is N, $G_B$ is represented by a labeled graph having N nodes. In this case, $\vec{f}_i$ refers to a normalized feature vector for the $i^{th}$ vertex of $G_A$, and $\vec{f}_\alpha$ refers to a normalized feature vector for the $\alpha^{th}$ vertex of $G_B$. Such a normalized feature vector is referred to as a local descriptor in some documents. For example, the normalized feature vector may be a vector based on Gabor wavelets of varying scale and orientation around points of interest. The edges of the graphs $G_A$ and $G_B$ represent the geometric relationship between the feature vectors. The similarity between the image of Part (a) of FIG. and the image of Part (b) of FIG. 1 may be found by obtaining the similarity between the two labeled graphs $G_A$ and $G_B$.

$$d(i,\alpha)=d_{feature}(\vec{f}_i,\vec{f}_\alpha) \quad (1)$$

$d(i,\alpha)$ is the scalar product of the feature vectors $\vec{f}_i$ and $\vec{f}_\alpha$, may be interpreted as a measure of similarity between associated feature vectors, and is a normalized value. In this case, a match of a point i obtained from Part (a) of FIG. 1 and a point $\alpha$ obtained from Part (b) of FIG. 1 may be defined as $(i,\alpha)$. When a measure indicative of whether the match $(i,\alpha)$ is a point-to-point potential match appropriate to describe a pattern is defined as a point-wise threshold $T_{feature}$ the match $(i,\alpha)$ may be interpreted as a potential point-to-point match appropriate to describe a pattern match if the match $(i,\alpha)$ satisfies $d(i,\alpha)>T_{feature}$.

A conflict graph $G_C$ may be generated from the graphs $G_A$ and $G_B$ as a measure used to measure the similarity between the graphic representations of Part (a) and Part (b) of FIG. 1. The conflict graph $G_C$ may be generated by sequentially adding potential point-to-point matches, appropriate to describe the pattern, from the match $(i,\alpha)$ having the largest $d(i,\alpha)$ value as the vertices $V_{i\alpha}$ of the conflict graph $G_C$. The process of generating the conflict graph $G_C$ may be repeated until all appropriate point-to-point matches are included.

The edges $(i,\alpha; j,\beta)$ within the conflict graph $G_C$ may be interpreted as measures representative of the geometric consistency between vectors $\vec{f}_i$ and $\vec{f}_j$ within the labeled graph $G_A$ corresponding to the image of Part (a) of FIG. 1 and the geometric consistency between vectors $\vec{f}_\alpha$ and $\vec{f}_\beta$ within the labeled graph $G_B$ corresponding to the image of Part (b) of FIG. 1 through encoding.

The geometric consistency $d(i,\alpha,j,\beta)=d_{geometric}(\vec{g}_{ij}, \vec{g}_{\alpha\beta})$ of two pairs between the points of interests may be computed for all vertex pairs $(V_{i\alpha}, V_{j\beta})$ (in the case where $i \neq j$ and $\alpha \neq \beta$) within the conflict graph $G_C$.

In this case, the geometric consistency $d(i,\alpha,j,\beta)= d_{geometric}(\vec{g}_{ij}, \vec{g}_{\alpha\beta})$ may be a normalized value.

The geometric consistency may become a means for measuring the geometric compatibility of matched point-to-point pairs $(i,\alpha)$ and $(j,\beta)$. In this case, since the geometric consistency may depend on the residual differences of influences attributable to the local displacement, scaling and rotation of associated points of interests after changes attributable to the global translation, rotation and scaling between the matched point-to-point pairs $(i,\alpha)$ and $(j,\beta)$ have been normalized, the geometric consistency may become a means for measuring geometric compatibility.

When the residual difference after the normalization is excessively large, the pairs $(i,\alpha)$ and $(j,\beta)$ are in geometric conflict, and this is interpreted as not being compatible, with the result that matching is not allowed.

When the geometric consistency $d(i,\alpha,j,\beta)=d_{geometric}(\vec{g}_{ij}, \vec{g}_{\alpha\beta})$ satisfies the condition $d(i,\alpha,j\beta)<T_{geometric}$ for the geometric conflict threshold $T_{feature}$ the point-to-point pairs $(i,\alpha)$ and $(j,\beta)$ are considered to be in geometric conflict.

The conflict graph $G_C$ has an edge for vertex pair $(V_{i\alpha}, V_{j\beta})_{if}$ in geometric conflict. In this case, $i \neq j$ and $\alpha \neq \beta$, as described above. In this manner, the conflict graph $G_C$ may have a maximum of L vertices. The maximum independent set of the conflict graph is equivalent to the maximum common subgraph of the unlabeled graphs $G_A$ and $G_B$.

A process of finding the maximum independent set of the conflict graph $G_C$ may be interpreted as a quadratic unconstrained binary optimization problem, as shown in Equation 2 below:

$$\vec{x}_{opt} = \arg\min\left\{\sum_{i\alpha < j\beta}^{N} Q_{i\alpha, j\beta} x_{i\alpha} x_{j\beta}\right\}, x_{i\alpha} \in \{0, 1\} \quad (2)$$

In this case, $Q_{i\alpha,i\alpha}=-1$ for all the vertices, and $Q_{i\alpha,j\beta}=L$ for the point-to-point pairs $(i,\alpha)$ and $(j,\beta)$ having edges on the conflict graph.

In the minimum energy configuration, $x_{i\alpha}=1$ only when $V_{i\alpha}$ belongs to the maximum independent set, and $x_{i\alpha}=0$ in the other cases. Equation 2 corresponds to a well-known NP-hard problem. It is well known that as L increases, computation time increases at a very fast speed.

In the following, Equation 2 is modified to be applied to adiabatic quantum computation for a quantum Ising model.

When the column vector of N Boolean variables is $$X = \begin{pmatrix} x_1 \\ x_2 \\ x_3 \\ \vdots \\ x_N \end{pmatrix}$$

and an N×N matrix is Q, Equation 2 may be represented by Equation 3 below:

$$X_{opt} = \arg\min X^\dagger QX \text{ where } x_i \in \{0,1\} \quad (3)$$

Meanwhile, a quantum Ising problem may be represented by Equation 4 by applying the relation $S=2X-1$ to Equation 3 and changing a variable from X to S:

$$S_{opt} = \arg\min\{S^\dagger JS + h^{544} S\} \text{ where } S_i \in \{-1,1\} \quad (4)$$

The variable S is referred to as a quantum-mechanical spin, and a solution to the quantum Ising model can be found by adiabatic quantum computing (AQC), i.e., a specific model of quantum computing.

In quantum mechanics, $S=\pm 1$ of spin states can be represented by qubits that refer to orthogonal vectors in a Hilbert space. The two states of qubits may be described by the vectors of Equation 5 below:

$$|0\rangle = \begin{pmatrix} 1 \\ 0 \end{pmatrix} \text{ and } |1\rangle = \begin{pmatrix} 0 \\ 1 \end{pmatrix} \quad (5)$$

Qubits may be extended to vectors by linear combination called superposition, and this process is represented by Equation 6 below:

$$|\phi\rangle = \alpha|0\rangle + \beta|1\rangle \text{ with } |\alpha|^2 + |\beta|^2 = 1 \quad (6)$$

A large quantum system is configured via the tensor product of individual qubit vector spaces. For example, this may be represented by Equation 7 below:

$$|01\rangle = |0\rangle \otimes |1\rangle = \begin{pmatrix} 0 \\ 1 \\ 0 \\ 0 \end{pmatrix} \quad (7)$$

The superposition of N qubit states may have associated amplitudes representative of probabilities that individual N spin states can be observed.

Furthermore, a single qubit operator may be defined as Equation 8 below:

$$I = \begin{pmatrix} 1 & 0 \\ 0 & 1 \end{pmatrix} \text{ and } \sigma^z = \begin{pmatrix} 1 & 0 \\ 0 & -1 \end{pmatrix} \quad (8)$$

When the operator of Equation 8 is applied to the qubit vector of Equation 5, Equation 9 can be obtained:

$$\sigma^z|0\rangle = |0\rangle, \sigma^z|1\rangle = -|1\rangle \quad (9)$$

In a two-qubit state, the operator $\sigma^z \otimes I$ may extract the classical spin of a first qubit, the operator $I \otimes \sigma^z$ may extract the classical spin of a second qubit, and the operator $\sigma^z \otimes \sigma^z$ may extract the product of the two classical spins.

The N spin quantum Ising model is represented by $2^N \times 2^N$ Hamiltonians, as shown in Equation 10 below:

$$H_I = \sum_{i,j} J_{ij} \sigma_i^z \sigma_j^z + \sum_i h_i \sigma_i^z \quad (10)$$

where $\sigma_i^z$ refers to the operator $\sigma^z$ that acts upon an $i^{th}$ qubit.

In order to initiate the quantum system, another type of spin operator $\sigma^x$ may be defined, as shown in Equation 11 below:

$$\sigma^x = \begin{pmatrix} 1 & 0 \\ 0 & 1 \end{pmatrix} \quad (11)$$

The spin operator of Equation 11 may flip the state of a qubit.

In this case, a ground state Hamiltonian may be represented by a spin operator acting upon an $i^{th}$ qubit, as shown in Equation 12 below:

$$H_0 = \Delta \sum_i \sigma_i^x \quad (12)$$

Furthermore, the eigenstate of the ground state Hamiltonian of Equation 12 may be represented by Equation 13 below:

$$|\Phi\rangle_0 = \bigotimes \left(\frac{|0\rangle_i - |1\rangle_i}{\sqrt{2}}\right) \quad (13)$$

The time dependency of the quantum state of Equation 13 may be represented by the Schrodinger equation of Equation 14 below:

$$i\hbar \frac{\partial}{\partial t}|\Psi(t)\rangle = H(t)|\Psi(t)\rangle \qquad (14)$$

Using an initial condition, given as $|\Psi(0)\rangle = |\Phi\rangle_0$ at t=0, to adiabatically solve the quantum Ising model, the convex form of the adiabatic Hamiltonian may be represented by Equation 15 below:

$$H(t) = \left(1 - \frac{t}{T}\right)H_0 + \frac{t}{T}H_I \qquad (15)$$

At t=0, the quantum system has the lowest energy state. In this case, the lowest energy state may provide an equivalent probability for all classical configurations. In contrast, at t=T, design is made to correspond to the quantum Ising model problem adapted to solve the machine vision problem.

In this manner, the NP-hard problem that cannot be processed in a classical manner may be solved through the quantum-mechanical adiabatic evolution of the given quantum system.

The globally lowest classical configuration obtained through adiabatic quantum computing (AQC) may be a solution to the quadratic unconstrained binary optimization problem, which is a complex computational problem related to machine vision. It has been mathematically proved that quantum computing can provide exponential speed-up to the solution of the NP-hard problem compared to a classical method.

A process of training the adiabatic quantum computing system to solve the quadratic unconstrained binary optimization problem defined by Equation 2 starts with the training of hardware using a classification algorithm. The classification algorithm is represented by Equation 16 below:

$$y = \text{sign}\left(\sum_{i=1}^{N} \omega_i h_i(x)\right) \qquad (16)$$

In this case, $x \in R^M$ is an input pattern to be classified, and $y \in \{-1, 1\}$ is an output classified by a classifier. $h_i : R^M \mapsto \{-1, 1\}$ is a function of x adapted to detect a feature, and $\omega_i \in \{0, 1\}$ is a weight for optimization during training.

The training may be performed by solving a discrete optimization problem represented by Equation 17 below:

$$\omega_{opt} = \arg\min_{\omega}\left(\omega^{\dagger}\left(\frac{1}{N^2}\sum_{s=1}^{S} h(x_s)h(x_s)^{\dagger}\right)\omega + \omega\left(\lambda I - 2\sum_{s=1}^{S}\frac{h(x_s)}{N}y_s\right)\right) \qquad (17)$$

In this case, Equation 17 is described for S training samples $\{(x_s, y_s) | s=1, 2, \ldots, S\}$.

In the following, equations capable of implementing hardware for solving the machine vision problem and describing the hardware will be described. The hardware may be implemented based on the quantum Ising model of trapped ion spin-phonon chains. The quantum Ising model of trapped ion spin-phonon chains is a dipole-based physical model. An optimized solution to a specific vector for the solution of the machine vision problem may be obtained by matching a dipole to the specific vector for the solution of the machine vision problem and optimizing the state variable of a dipole through quantum-mechanical adiabatic evolution. The dipole is a physical property having an orientation and a scale attributable to a magnetic field or the like. The dipole is each element of the quantum Ising model, and may be matched to a specific vector for the solution of the machine vision problem.

In theory, the dipole may model the system to describe the feature vectors $\vec{f}_i$ and $\vec{f}_\alpha$, and may model the system to describe relation vectors $\vec{g}_{i,j}$ in which a point of interest (a feature point) i is a start point and a point of interest (a feature point) j is an end point in the image of Part (a) of FIG. 1. When the dipole is modeled to describe the feature vectors $\vec{f}_i$ and $\vec{f}_\alpha$, the similarity $d(i, \alpha) = d_{feature}(\vec{f}_i, \vec{f}_\alpha)$ between associated feature vectors may be obtained by obtaining the scalar product of dipoles. When the dipole is modeled to describe the relation vectors $\vec{g}_{i,j}$, the geometric consistency $d(i, \alpha, j, \beta) = d_{geometric}(\vec{g}_{i,j}, \vec{g}_{\alpha\beta})$ of two pairs may be obtained by computing the dipoles.

A Hamiltonian adapted to solve the quantum Ising model of trapped ion spin-phonon chains may be represented by Equation 18:

$$H = \sum_{i,j} J_{j,l}^{\Delta k} \sigma_j^Z \sigma_l^Z + H_{ph} \qquad (18)$$

In this case, $J_{j,l}^{\Delta k}$ is a value that can be tuned by an external bias, and represents Ising interaction for spin-phonon chains. Furthermore, $H_{ph}$ represents a chain that is described by a hopping phonon. Meanwhile, since the Hamiltonian refers to an energy state, setting up the Hamiltonian as an objective function and obtaining an optimized Hamiltonian (a state in which energy is minimum) may be understood as obtaining an optimized objective function.

Individual charge detection may be performed by a spin-dependent single-electron tunneling event through the single-shot detection of a sensitive charge detector capacitively coupled to a quantum dot.

The Hamiltonian of the N quantum dot system may be represented by Equation 19 below:

$$H_I = \sum_{i<j} J_{ij} \sigma_i^Z \sigma_j^Z + \sum_i h_i \sigma_i^Z \qquad (19)$$

The parameters $J_{ij}$ and $h_i$ are positive variables, and the variables may be changed by the application of external voltages. These bias voltages of gates may be controlled to obtain a Hamiltonian appropriate for a required quantum operator.

An initial Hamiltonian at t=0 may be obtained by setting a bias so that $J_{ij}=0$ for all I and j. The variable T of Equation 15 may be defined as $T = \hbar/\Delta E$. In this case, $\Delta E$ represents energy separation between initial ground state energy and global minimum energy.

Figure 2:
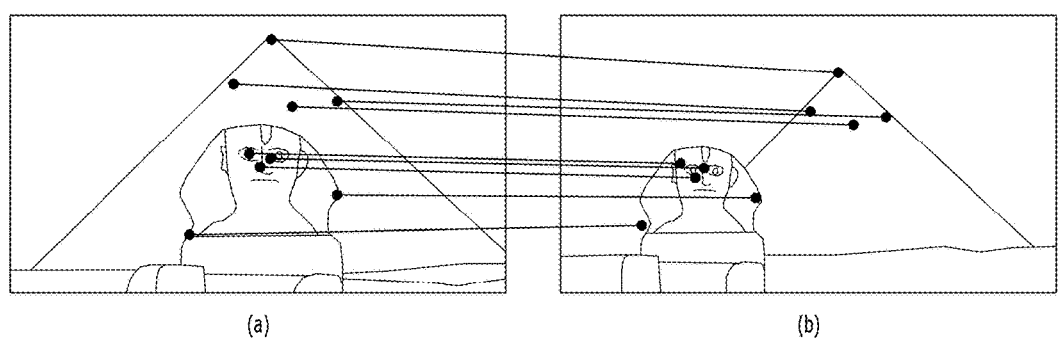
FIG. 2 is a diagram showing conventional pattern recognition machine vision modeling.

FIG. 2 is a diagram showing conventional pattern recognition machine vision modeling.

Figure 3:
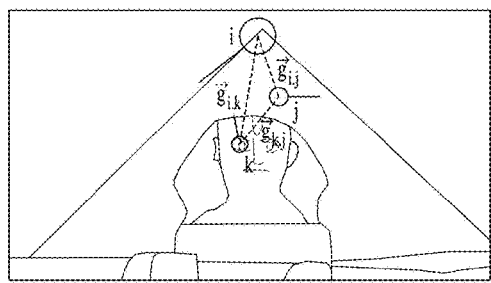
FIG. 3 shows a process of modeling feature points within two images of Part (a) and Part (b) of FIG. 2 as vectors and a labeled graph.
Figure 3:
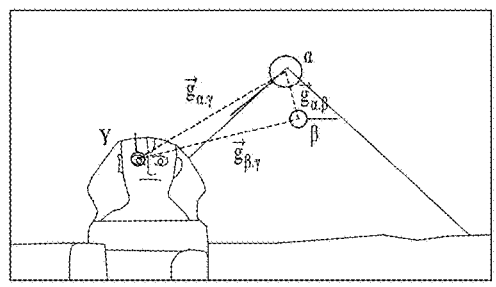

The images of FIGS. 2 and 3 were quoted from "Image recognition with an adiabatic quantum computer, I. Mapping to quadratic unconstrained binary optimization," Hartmut Neven et al., Apr. 28, 2008.

Part (a) of FIG. 2 shows a reference image, and Part (b) of FIG. 2 shows an input image.

General pattern recognition machine vision modeling is performed by pairing feature points in two images having the same structure in the real world. In this case, similarity and geometric consistency may become criteria that are used to determine the extent to which two images are similar to each other. According to this, the vertices of a pyramid, the eye, nose and mouth portion of the face of the Sphinx, the boundary points of a collapsed portion of a pyramid, etc. may become the reference points of pairing. However, strictly speaking, each of these items is not a single point, but is defined as a single feature region having a plurality of feature points. It may be represented by different scales and orientations in Part (a) and Part (b) of FIG. 2 depending on the angle at which it is seen.

FIG. 3 shows a process of modeling feature points within two images of Part (a) and Part (b) of FIG. 2 as vectors and a labeled graph.

As shown in Part (a) of FIG. 3, the relation vectors between feature points i, j and k may be defined for the image of Part (a) of FIG. 2. In Part (b) of FIG. 3, the relation vectors between feature points α, β and γ may be defined for the image of Part (b) of FIG. 2. A process of describing each image by using a labeled graph, i.e., a set of relation vectors between feature points, as described above, is shown via FIG. 3.

From the embodiment of FIG. 3, it can be intuitively seen that the feature points i, j and k of Part (a) of FIG. 3 correspond to the feature points α, β and γ of Part (b) of FIG. 3. Since pattern recognition has been performed already by the eyes of a human, the correspondences of the feature points between the images can be clearly recognized. However, in machine vision, all the computation starting from computation related to the determination of which of the feature points α, β and γ corresponds to the feature point i or the selection of a point as a feature point must be performed, and thus this computation corresponds to an NP-hard problem that requires more computational load in proportion to the number of feature points.

Figure 4:
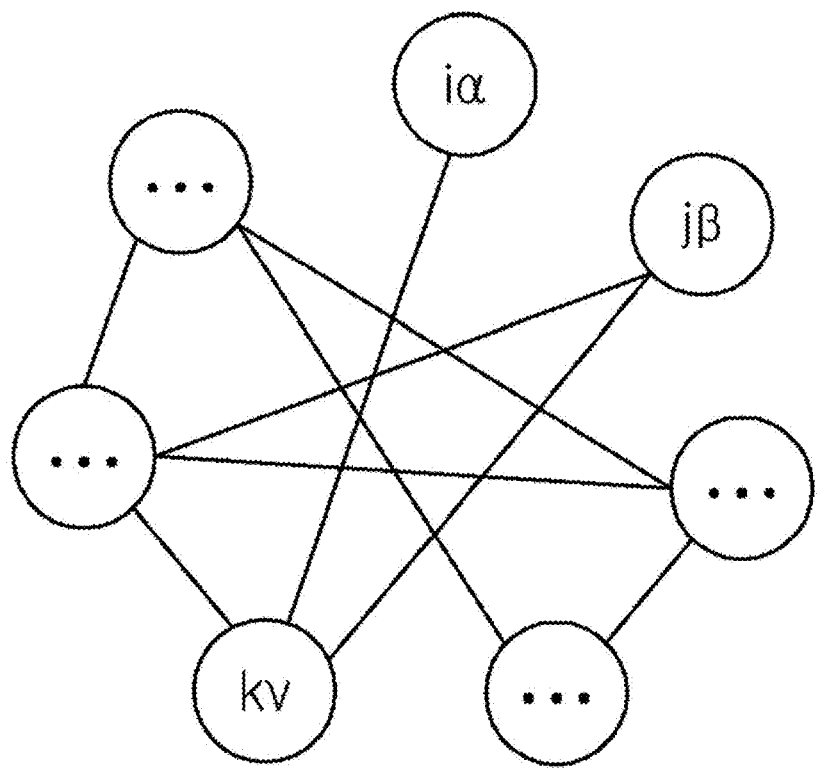
FIG. 4 is a diagram showing the relationships between points of interest at principal points of interest according to an embodiment of the present invention.

FIG. 4 is a diagram showing the relationships between points of interest at principal points of interest according to an embodiment of the present invention.

In FIG. 4, i, j and k refer to the feature points of Part (a) of FIG. 3, and α, β and γ refer to the feature points of Part (b) of FIG. 3. Assuming that Part (b) of FIG. 3 is formed by moving or twisting Part (a) of FIG. 3, Part (b) of FIG. 3 and Part (a) of FIG. 3 may be compared by observing changes in feature locations in the present invention. The displacements of the feature points of Part (a) and Part (b) of FIG. 3 may not be determined using only the viewpoint of a camera. However, it may be expected that adjacent feature points have been displaced by a similar method.

That is, it can be expected that adjacent feature points will be moved together. As a result, image matching may be considered to be a type of optimization problem. This optimization problem may be modeled by an attempt to minimize an objective function between two terms.

An example shown in FIG. 4 is an embodiment showing mapping between the feature points of Part (a) of FIG. 3 and the feature points of Part (b) of FIG. 3. That is, although the feature point i may be mapped to one of the feature points α, β and γ, a case where the feature point α is mapped to the feature points a is shown in FIG. 4. The matched point-to-point pair (i, α) is shown as a vertex of the graph of FIG. 4.

If an objective function is designed to depend on the differences between the relationships (a set of arrows) between feature points in Part (a) of FIG. 3 and the relationships between feature points in Part (b) of FIG. 3, the pattern of Part (a) of FIG. 3 and the pattern of Part (b) of FIG. 3, which are described to be most similar to each other, may be found by minimizing the objective function.

The objective function is the energy of a quantum system in quantum computing. When energy is minimized, the quantum system converges into the most stabilized state, and thus the pattern of Part (a) of FIG. 3 and the pattern of Part (b) of FIG. 3 in the most stabilized state and the displacement relationships between Part (a) of FIG. 3 and Part (b) of FIG. 3 may be calculated. In this case, the displacement relationships refer to translation, rotation, and twisting between the images of Part (a) and Part (b) of FIG. 3.

In this case, the relationships between feature points are not necessarily formed to be a single pattern, and may be formed to be various patterns. Accordingly, an optimized pattern may be extracted as a first pattern. The minimum energy may be given a different value depending on the setting to being global or local. Depending on a set range, the result of the computation of an optimized pattern may vary slightly.

Figure 5:
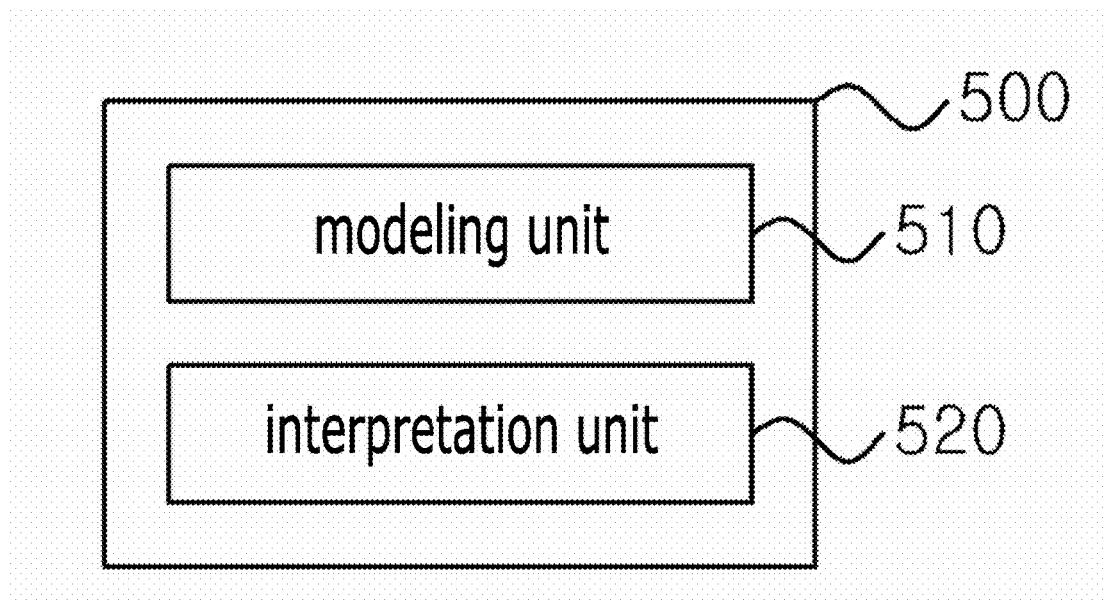
FIG. 5 is a detailed diagram showing an image pattern recognition computation apparatus for machine vision according to an embodiment of the present invention.

FIG. 5 is a detailed diagram showing an image pattern recognition computation apparatus for machine vision according to an embodiment of the present invention.

In machine vision using a quantum system, a computation apparatus 500 for recognizing patterns between images includes a modeling unit 510 and an interpretation unit 520.

The modeling unit 510 sets up an objective function based on the similarity between a first pattern derived from the relationships between points of interests of a first image and a second pattern derived from the relationships between points of interests of a second image.

In this case, the first image refers to an input image, e.g., the image of Part (a) of FIG. 1 for ease of description. The second image refers to a reference image, e.g., the image of Part (b) of FIG. 1. Furthermore, the points of interest have the same meaning as feature points of each of the images. However, in another embodiment, an input image and a reference image do not necessarily follow this example, but may correspond to the second and first images in a reversed manner.

The interpretation unit 520 finds an optimum first pattern and an optimum second pattern, in which the similarity between the first pattern and the second pattern modeled by the modeling unit 510 is optimized, by interpreting a final quantum state obtained through the adiabatic evolution process of the quantum system in which the objective function is optimized.

In this case, the quantum system is characterized by including a physical model that depends on the interaction between dipoles, and may model the pattern of an image, i.e., a combination of vectors using the interaction between physical dipoles of the image.

Furthermore, the quantum system may include an Ising model that depends on the dipole interaction of a magnetic body.

In this case, the Ising model uses a physical model that depends on trapped ion-based spin-phonon coupling.

Furthermore, the quantum system may include a physical model that has energy corresponding to the objective function.

Accordingly, machine vision-related complex computational problem may be modeled as the interaction between relation vectors between points of interest at principal points of interest, and the machine vision-related complex computational problem may be solved through the modeling.

Figure 6:
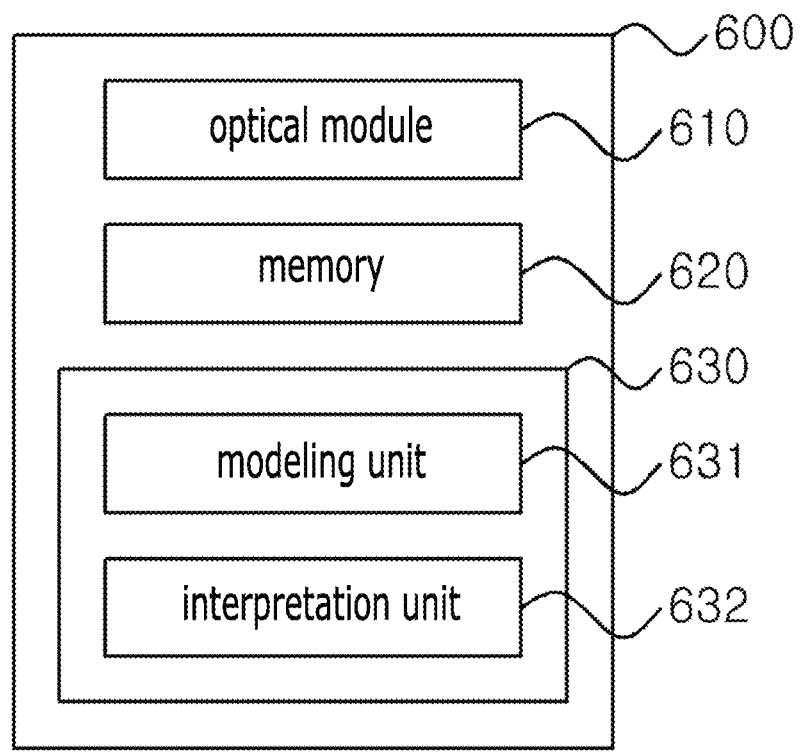
FIG. 6 is a detailed diagram showing a quantum system-based machine vision apparatus according to an embodiment of the present invention.

FIG. 6 is a detailed diagram showing a quantum system-based machine vision apparatus according to an embodiment of the present invention.

A machine vision apparatus 600 for recognizing patterns between images using a quantum system includes an optical module 610, memory 620, and a processor 630. The processor 630 includes a modeling unit 631, and an interpretation unit 632.

The optical module 610 acquires a first image. The optical module 610 is the generic terms for devices which form an image of an object in a space by using reflection, refraction, absorption, interference and diffraction, i.e., the characteristics of light radiated by the sun or an electric light, or which are used to investigate the characteristics of a specific object by analyzing radioactive rays emitted from the object.

The processor 630 derives a first pattern from the relationships between points of interests of the first image acquired by the optical module 610, and derives a second pattern from the relationships between points of interests of a second image. In this case, the second image is the reference image of the first image, and refers to an image into which the first image has been changed.

The memory 620 functions to store the first pattern and the second pattern that are derived by the processor 630.

The modeling unit 631 included in the processor 630 sets up an objective function based on the similarity between the first pattern and the second pattern stored in the memory 620. The interpretation unit 632 finds an optimum first pattern and an optimum second pattern, in which the similarity between the first pattern and the second pattern are optimized, by interpreting a final quantum state obtained through the adiabatic evolution process of the quantum system in which the objective function is optimized.

In this case, the processor 630 vectorizes the relationships between the points of interests of the first image, models a set of the vectorized relationships between the points of interests of the first image as the first pattern, vectorizes the relationships between the points of interests of the second image, and models a set of the vectorized relationships between the points of interests of the second image as the second pattern.

Furthermore, the quantum system may include a physical model that depends on the interaction between dipoles.

Figure 7:
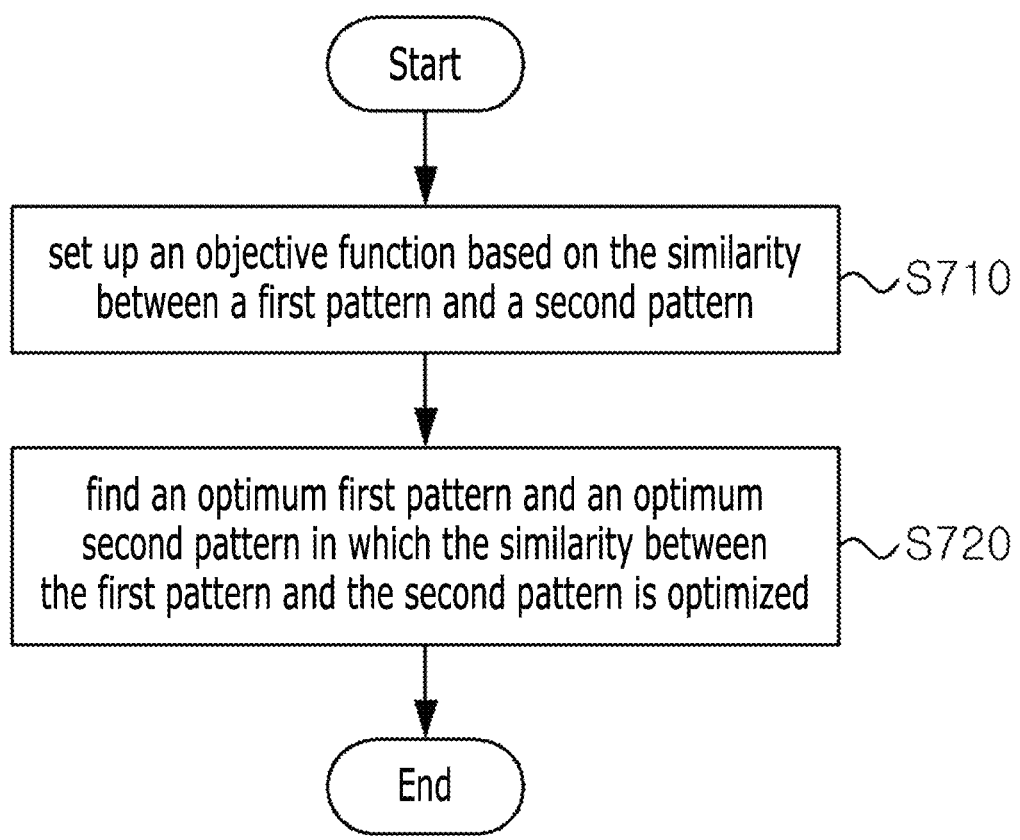
FIG. 7 is a flowchart showing an image pattern recognition computation method for machine vision according to an embodiment of the present invention.

FIG. 7 is a flowchart showing an image pattern recognition computation method for machine vision according to an embodiment of the present invention.

A computation method for recognizing patterns between images in machine vision by using a quantum system includes step S710 of setting up an objective function based on the similarity between a first pattern derived from the relationships between points of interests of a first image and a second pattern derived from the relationships between points of interests of a second image.

In this case, the relationships between the points of interests of the first image may be vectorized, a set of the vectorized relationships between the points of interests of the first image may be modeled as the first pattern, the relationships between the points of interests of the second image may be vectorized, and a set of the vectorized relationships between points of interests of the second image may be modeled as the second pattern.

In this case, the first image refers to an input image, and the second image refers to an image into which the first image has been changed, i.e., the reference image of the first image.

At step S720, an optimum first pattern and an optimum second pattern in which the similarity between the first pattern and the second pattern are optimized are found by interpreting a final quantum state obtained through the adiabatic evolution process of the quantum system in which the objective function is optimized.

In this case, the quantum system is characterized by including a physical model depending on the interaction between dipoles, and is characterized by including an Ising model depending on the dipole interaction of a magnetic body.

In this case, the Ising model is characterized in that it is a physical model depending on trapped ion-based spin-phonon coupling, and the quantum system may include a physical model having energy corresponding to the objective function.

Accordingly, machine vision-related complex computational problem may be modeled as the interaction between relation vectors between points of interest at principal points of interest, and the machine vision-related complex computational problem may be solved through the modeling.

In the above embodiments, technologies related to the modeling of machine vision-related complex computational problem using the adiabatic evolution of a quantum system and quantum computing have been disclosed. The idea of the present invention contemplates that the objective function of Equation 2 may be set up, a quantum system may be selected and implemented to include a physical model depending on the interaction between dipoles, and the pattern of an image, i.e., a combination of vectors of the image, may be modeled as the interaction between physical dipoles. The modeled Hamiltonian of the quantum system is given as Equation 10.

Although the idea of the present invention has been disclosed with a focus on the embodiments of the image pattern recognition of machine vision, the fields of application of the present invention are not limited only to machine vision. The problem of the pattern recognition disclosed above may be equivalently converted and applied to a problem of artificial intelligence or machine learning capable of representing pattern recognition as a combination of vectors.

Since the optimization problem in the field of artificial intelligence or machine learning may model an optimization process as a process of finding the optimum state of a Hamiltonian by using the adiabatic evolution of a quantum system, the ideal of the present invention may be applied to various fields.

An example of an application in the field of machine learning to which the idea of the present invention is applicable is a deep learning technique that has attracted attention recently. The deep learning technique is a technique by which a computer machine performs learning so that it can operate in accordance with the human way of thinking. For example, the deep learning technique is designed to represent patterns between elements of data by combinations of vectors based on interrelationships and combine the patterns, thereby recognizing the combination of the patterns as a higher grouped pattern. In the case of image information, an example in which the relationships between pixels are represented by column vectors is used. The deep learning technique refers to a process in which a computer performs learning to distinguish objects by imitating humans' information processing method in which the brain finds patterns among a massive amount of data and distinguishes objects. In the case of the deep learning technique, a process of finding a pattern is performed through the recognition and reasoning of a computer itself.

Conventional general deep learning techniques employ specific techniques, such as a deep neural network, a convolutional deep neural network, a deep belief network, etc., in order to represent a complex pattern recognition process so that computers can recognize the process. The conventional general deep learning techniques are applied to the fields of computer vision, voice recognition, natural language processing, voice/signal processing, etc.

Figure 8:
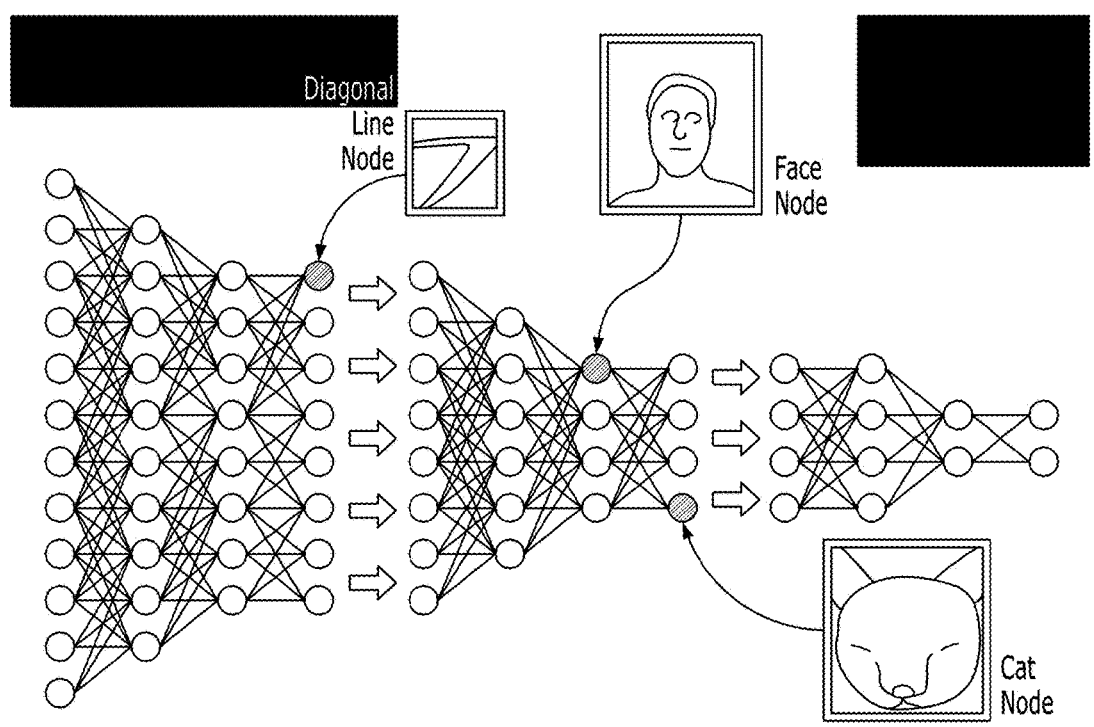
FIG. 8 is a diagram showing an example of a process of distinguishing between and recognizing the face of a human and the face of a cat by using deep learning.

Deep learning techniques based on pattern recognition entails a process of selecting only significant pattern candidates from among a number of potential pattern candidates. This process is shown in FIG. 8. FIG. 8 introduces a process of distinguishing between and recognizing the face of a human and the face of a cat by using deep learning. Although a number of pattern candidates are set up, only significant pattern candidates are finally selected, and the comprehensive evaluation of the images is performed based on the selected patterns.

The idea of the present invention is intended to replace the computation of all or part of a technique, such as a conventional complex deep neural network, through adiabatic evolution using a quantum system. It is well known that there are many cases where the neural network does not reach a global optimum due to an initial value and converges into a local optimum. To overcome this constraint, a hierarchical deep neural network or the like is used. However, fundamentally, it cannot be certain due to the characteristics of the neural network that a presented solution is a global optimum. There are cases where an exhaustive search for an initial state must be performed to obtain a global optimum. Furthermore, techniques, such as a deep neural network or the like, require considerable computational times, and thus cannot provide sufficiently desirable quality to real-time pattern recognition applications. The idea of the present invention is intended to reduce the time required for optimization computation by using the adiabatic evolution of a quantum system and to provide sufficiently desirable quality to real-time pattern recognition applications.

The idea of the present invention is applicable to cases where the relationships between the entries of data can be represented by respective vectors and the similarity between grouped patterns represented by combinations of vectors is analyzed. In connection with the combinations of vectors, for example, in the case of news, the relationships between pieces of text, i.e., contexts, are extracted, and may be provided as vectorized representations. In the case of voice data, changes in the frequency components over time may be extracted, and may be provided as vectorized representations. In this case, the vectors may be modeled as the physical state variables of the quantum system. For example, the Hamiltonian of Equation 10 is applicable to a case where the states of the quantum system may be described via dipoles, as described above.

The idea of the present invention may be also applicable to the reading and diagnosis of medical images, applications designed to predict the effectiveness of a new medicine or detect a side effect in advance in the pharmaceutical industry, pattern recognition for the planning of marketing or automation of customer management, and applications designed to extract significant information from a massive amount of data obtained via the Internet of Things and analyze the extracted information.

The quantum system-based image pattern recognition computation method for machine vision according to an embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

According to the present invention, machine vision-related complex computational problem can be accurately solved by modeling the machine vision-related complex computational problem as the interaction between relation vectors between points of interest at principal points of interest in each image.

The present invention provides the advantage of easily solving machine vision-related complex computational problem by applying a physical model regarding the interaction between dipoles to interaction between vectors and using Ising model-based quantum computing hardware.

Furthermore, the present invention provides the advantage of configuring quantum computing hardware by using an Ising model, particularly trapped ion-based spin-phonon coupling, and solving a machine vision-related complex computational problem based on a physical model capable of solving the configured quantum computing hardware.

While the present invention has been described in conjunction with specific details, such as specific elements, and limited embodiments and diagrams, above, these are provided merely to help an overall understanding of the present invention. The present invention is not limited to these embodiments, and various modifications and variations can be made based on the foregoing description by those having ordinary knowledge in the art to which the present invention pertains.

Therefore, the technical spirit of the present invention should not be determined based only on the described embodiments, and not only the following claims but also all equivalents to the claims and equivalent modifications should be construed as falling within the scope of the spirit of the present invention.

What is claimed is:

1. A quantum system-based image pattern recognition computation apparatus for machine vision, the computation apparatus recognizing patterns between images in machine vision by using a quantum system, the computation apparatus comprising:
   a memory configured to store program instructions; and
   a processor configured to execute the program instructions, the program instructions, when executed, configured to:
   set up an objective function based on similarity between a first pattern derived from relationships between points of interests of an input image and a second pattern derived from relationships between points of interests of a reference image;

find an optimum first pattern and an optimum second pattern, in which the similarity between the first pattern and the second pattern is optimized, by interpreting a final quantum state obtained through an adiabatic evolution process of the quantum system in which the objective function is optimized; and recognize that the input image matches the reference image if the optimized similarity is greater than a predetermined threshold value, wherein the quantum system comprises a physical model that depends on interaction between dipoles, and a Hamiltonian is set up as the objective function, wherein the Hamiltonian is adapted to solve the physical model, and the Hamiltonian includes a qubit operator term associating a superposition of qubit states.

2. The quantum system-based image pattern recognition computation apparatus of claim 1, wherein the program instructions are further configured to:

vectorize the relationships between the points of interests of the input image, and generate the first pattern by modeling a set of the vectorized relationships between the points of interests of the input image as the first pattern; and vectorize the relationships between the points of interests of the reference image, and generate the second pattern by modeling a set of the vectorized relationships between the points of interests of the the reference image as the second pattern.

3. The quantum system-based image pattern recognition computation apparatus of claim 1, wherein the quantum system comprises an Ising model that depends on dipole interaction of a magnetic body.

4. The quantum system-based image pattern recognition computation apparatus of claim 3, wherein the Ising model is a physical model that depends on trapped ion-based spin-phonon coupling.

5. The quantum system-based image pattern recognition computation apparatus of claim 1, wherein the quantum system comprises a physical model that has energy corresponding to the objective function.

6. A quantum system-based machine vision apparatus, the machine vision apparatus recognizing patterns between images by using a quantum system, the machine vision apparatus comprising:

an optical device configured to receive light radiated from an optical energy source, and acquire an input image by using characteristics of the received light;

a processor configured to:
  derive a first pattern from relationships between points of interests of the acquired input image; and
  derive a second pattern from relationships between points of interests of a reference image; and memory configured to store the derived first and second patterns;

wherein the processor is further configured to:

set up an objective function based on similarity between the first pattern and the second pattern stored in the memory;

find an optimum first pattern and an optimum second pattern, in which the similarity between the first pattern and the second pattern is optimized, by interpreting a final quantum state obtained through an adiabatic evolution process of the quantum system in which the objective function is optimized; and recognize that the input image matches the reference image if the optimized similarity is greater than a predetermined threshold value, wherein the quantum system comprises a physical model that depends on interaction between dipoles, and a Hamiltonian is set up as the objective function, wherein the Hamiltonian is adapted to solve the physical model, and the Hamiltonian includes a qubit operator term associating a superposition of qubit states.

7. The quantum system-based machine vision apparatus of claim 6, wherein the processor is further configured to:

vectorize the relationships between the points of interests of the input image, and generate the first pattern by modeling a set of the vectorized relationships between the points of interests of the input image as the first pattern; and vectorize the relationships between the points of interests of the reference image, and generate the second pattern by modeling a set of the vectorized relationships between the points of interests of the reference image as the second pattern.

8. A quantum system-based pattern recognition computation apparatus for artificial intelligence or machine learning, the computation apparatus recognizing and optimizing artificial intelligence or machine learning-based patterns, the computation apparatus being connected to a quantum system, the computation apparatus comprising:

a memory configured to store program instructions; and a processor configured to execute the program instructions, the program instructions, when executed, configured to:

set up an objective function based on similarity between a first pattern derived from relationships between elements of input image and a second pattern derived from relationships between elements of reference image;

find an optimum first pattern and an optimum second pattern, in which the similarity between the first pattern and the second pattern is optimized, by interpreting a final quantum state obtained through an adiabatic evolution process of the quantum system in which the objective function is optimized; and recognize that the input image matches the reference image if the optimized similarity is greater than a predetermined threshold value, wherein the quantum system comprises a physical model that depends on interaction between dipoles, and a Hamiltonian is set up as the objective function, wherein the Hamiltonian is adapted to solve the physical model, and the Hamiltonian includes a qubit operator term associating a superposition of qubit states.

9. A quantum system-based image pattern recognition computation method for machine vision, the computation method recognizing patterns between images in machine vision by using a quantum system, the computation method comprising:

setting up an objective function based on similarity between a first pattern derived from relationships between points of interests of an input image and a second pattern derived from relationships between points of interests of a reference image;

finding an optimum first pattern and an optimum second pattern, in which the similarity between the first pattern and the second pattern is optimized, by interpreting a final quantum state obtained through an adiabatic evolution process of the quantum system in which the objective function is optimized; and recognizing that the input image matches the reference image if the optimized similarity is greater than a predetermined threshold value, wherein the quantum system comprises a physical model that depends on interaction between dipoles, and a Hamiltonian is set up as the objective function, wherein the Hamiltonian is adapted to solve the physical model, and the Hamiltonian includes a qubit operator term associating a superposition of qubit states.

10. The quantum system-based image pattern recognition computation method of claim 9, wherein the setting up comprises:
vectorizing the relationships between the points of interests of the input image, and modeling a set of the vectorized relationships between the points of interests of the input image as the first pattern; and
vectorizing the relationships between the points of interests of the reference image, and modeling a set of the vectorized relationships between the points of interests of the reference image as the second pattern.

11. The quantum system-based image pattern recognition computation method of claim 9, wherein the quantum system comprises an Ising model that depends on dipole interaction of a magnetic body.

12. The quantum system-based image pattern recognition computation method of claim 11, wherein the Ising model is a physical model that depends on trapped ion-based spin-phonon coupling.

13. The quantum system-based image pattern recognition computation method of claim 9, wherein the quantum system comprises a physical model that has energy corresponding to the objective function.

14. A quantum system-based pattern recognition computation method for artificial intelligence or machine learning using a computation apparatus recognizing and optimizing artificial intelligence or machine learning-based patterns, the computation method comprising:
setting up, by the computation apparatus, an objective function based on similarity between a first pattern derived from relationships between elements of input image and a second pattern derived from relationships between elements of reference image;
connecting the computation apparatus to a quantum system that is configured to model the first pattern and the second pattern as physical state variables;
finding an optimum first pattern and an optimum second pattern, in which the similarity between the first pattern and the second pattern is optimized, by interpreting a final quantum state obtained through an adiabatic evolution process of the quantum system in which the objective function is optimized; and
recognizing that the input image matches the reference image if the optimized similarity is greater than a predetermined threshold value, wherein
the quantum system comprises a physical model that depends on interaction between dipoles, and
a Hamiltonian is set up as the objective function, wherein the Hamiltonian is adapted to solve the physical model, and the Hamiltonian includes a qubit operator term associating a superposition of qubit states.

* * * * *